Nov. 28, 1944. S. W. WEBSTER 2,363,821
LIQUID LEVEL CONTROL FOR HYDROMATIC BRAKES
Filed July 8, 1940  3 Sheets-Sheet 1

SAMUEL W. WEBSTER,
INVENTOR;
BY
ATTORNEY.

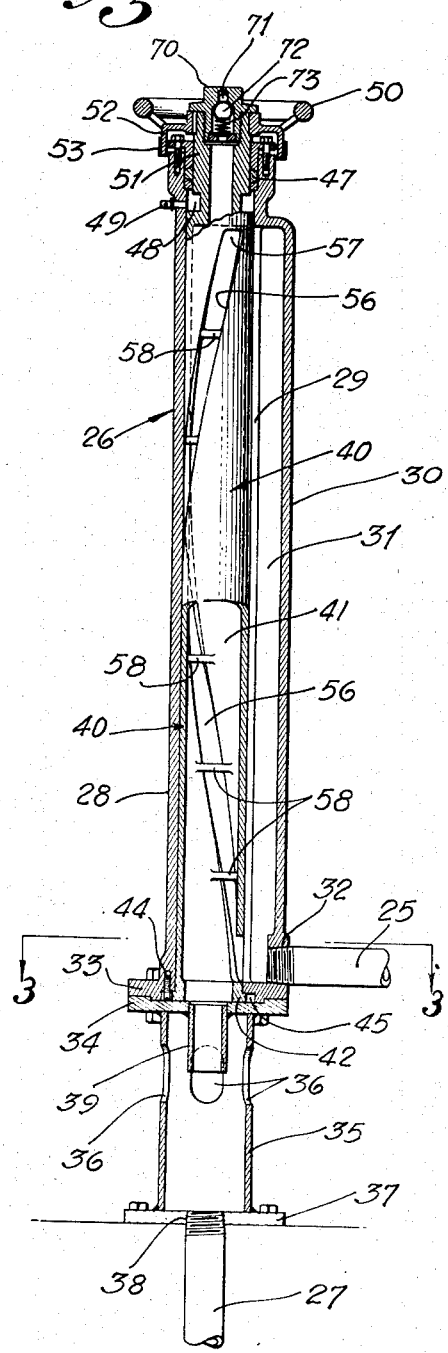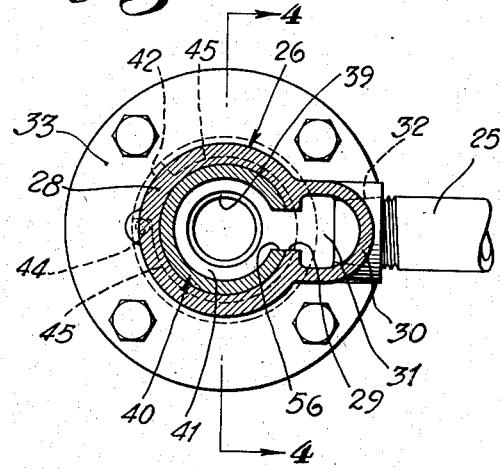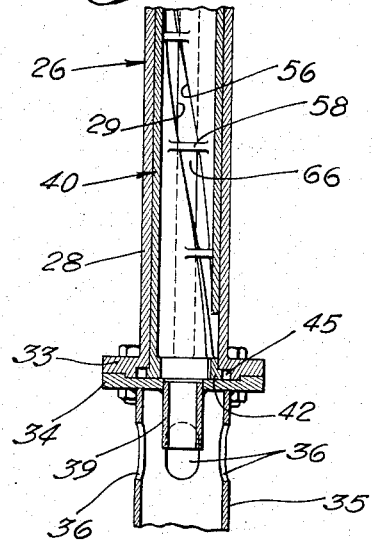

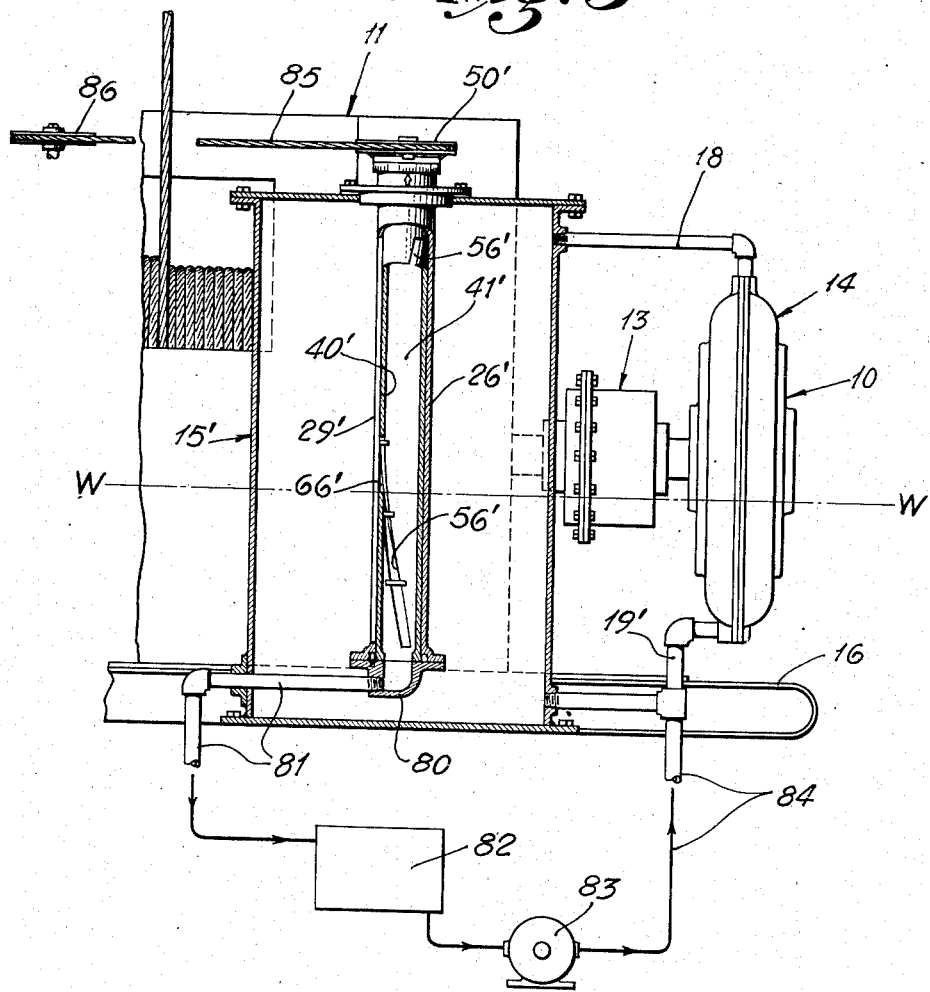

Patented Nov. 28, 1944

2,363,821

UNITED STATES PATENT OFFICE 2,363,821

LIQUID LEVEL CONTROL FOR HYDROMATIC BRAKES

Samuel W. Webster, Houston, Tex., assignor to Emsco Derrick & Equipment Company, Los Angeles, Calif., a corporation of California Application July 8, 1940, Serial No. 344,407

2 Claims. (Cl. 188—90)

My invention relates to a device for use with and control of hydromatic brakes of the type employed on rotary drawworks to control the rotation of the associated parts of the drawworks and in particular the rotation of the cable drum of the drawworks.

Hydromatic is the term applied in this art to brakes of the general type above referred to which ordinarily comprise a shell containing a stator in which a rotor is positioned, this rotor being attached to a rotating part such as the drum shaft. The braking effect in such a device results from the reaction or energy consumed in moving a liquid, such as water, through the passages or spaces of the rotor and stator. The braking reaction or energy consumed varies in accordance with the volume of water within or passing through the brake.

It is an object of my present invention to provide a simple and effective means for controlling the supply of water, or other liquid, to hydromatic brakes thereby improving the action, ease of control, and dependability thereof.

It is a further object of the invention to provide in combination with a hydromatic brake and water column in adjacent and interconnected relation, a simple means operable by the driller to vary the head of water in the water column, thereby varying the supply of water to the brake so that the action of the brake is correspondingly varied.

It is a further object to provide in an arrangement such as set forth in the foregoing paragraph, a standpipe of variable height and simple means for varying the effective height of the standpipe.

A further object of the invention is to provide in cooperation with the water column or container associated with a hydromatic brake, a standpipe having rotatable means for varying the effective height of an overflow opening, thereby varying the head of liquid maintained in the container.

A further object of the invention is to provide a variable height standpipe or overflow device having a pair of cylindrical members one within the other, and arranged for relative rotation whereby cooperative openings in the walls of the cylinders may be brought into different positions of cooperation to have the effect of varying the height of an overflow port.

A further object of the invention is to provide for a hydromatic brake which is connected to a rotary drawworks, an adjustable standpipe disposed at the position occupied by the driller when he handles the control of the rotary drawworks, this standpipe being adjusted by the driller to establish a desired head or level of water in the water column or container connected to the hydromatic brake.

A further object of the invention is to provide a device which not only gives an improved control of the hydromatic brake but also avoids the unsatisfactory condition of operation resulting from the hydromatic brake discharging water therefrom faster than it is fed into the inlet of the brake.

It is an object of the present invention to provide immediately adjacent to the brake a container which will maintain a sizable supply of water at the inlet of the brake and which container also has means for varying the level of water therein under direct control of the driller occupying the customary position at the controls of the drawworks.

Further objects and advantages of the invention will be brought out in the following part of the specification.

Referring to the drawings which are for illustrative purposes only:

Fig. 2 is an enlarged vertically sectioned view of the variable height standpipe shown in Fig. 1.

Fig. 3 is an enlarged cross-section taken on the plane represented by the line 3—3 of Fig. 2.

Fig. 4 is a fragmentary section taken as indicated by the line 4—4 of Fig. 3.

Fig. 5 is a view showing an alternative form of the invention.

Figure 1:
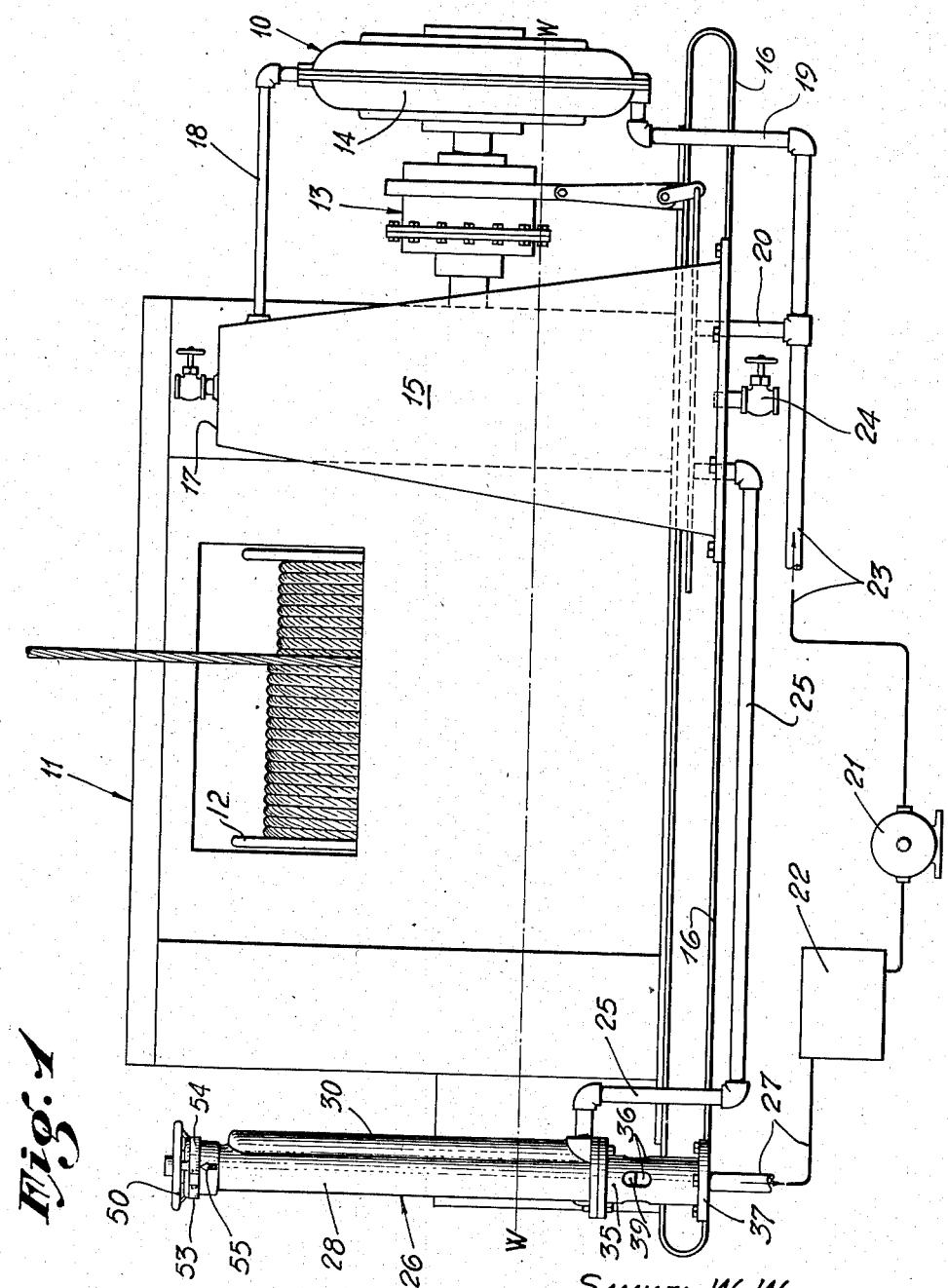
Fig. 1 is an elevational view of diagrammatic character showing a preferred embodiment of my invention connected to a hydromatic brake associated with a rotary drawworks.

As shown in Fig. 1, it is now customary to mount a hydromatic brake 10 at an end of a rotary drawworks 11 and to connect this hydromatic brake to the drum 12 a clutch 13 may be employed, such clutch being disengaged during the time a line is being pulled from the hole or a relatively light load is being handled by the drawworks.

The type of hydromatic brake to which this invention particularly relates comprises an outer shell 14 containing a stator and a rotor not shown for the reason that the present invention is not of a hydromatic brake but of a means for controlling the supply of liquid to the brake. Adjacent the hydromatic brake 10 I place a container or water column 15 comprising a hollow body of the form of a slender truncated cone. This water column 15 is of such height that when it is supported on the floor 16, the top 17 thereof will be close to or above the horizontal plane defined by the top of the brake 10. The upper part of the water column 15 is connected by a pipe 18 with the upper part of the brake 10, and the lower part of the shell 14 of the brake 10 is connected through piping 19 and a nipple 20 with the lower part of the column 15. As diagrammatically shown in Fig. 1, a liquid supply pump 21 in continuous operation pumps liquid, for example, water, from a reservoir 22 through piping 23 and the nipple 20 into the column 15, or part of the water from the piping 23 may pass through the piping 19 into the shell 14 of the brake 10, as will be later understood from the description of the operation of the device.

The column 15 is provided with a drain valve 24, and piping 25 leads from the bottom of the column 15 to a variable height standpipe or overflow device 26 which is positioned adjacent the space occupied by the driller when he operates the control of the rotary drawworks 11. From the lower part of the device 26 return piping 27 extends to the reservoir 22.

As best shown in Fig. 2, the variable height standpipe 26 comprises a vertically disposed cylindrical shell 28 having a slot 29 in one side thereof and extending nearly to the top of the shell 28. A hollow rib 30 is formed on the exterior of the cylindrical shell 28 in such position that the interior 31 thereof forms a vertical passage in communication with the slot 29. At the lower end of the vertical passage 31 there is a threaded opening 32 to which the piping 25 connects. At the lower end of the shell 28 there is a flange 33 which rests upon and is bolted to a flange 34 formed at the upper end of a pipe 35 having several openings 36 in the upper portion thereof. The lower end of this pipe 35 has a base or bottom wall 37 with a threaded opening 38 to which the return piping 27 may be connected. An outlet nipple 39 projects downward from the upper flange 34, within the upper part of the pipe 35. Within the cylindrical shell 28 a cylindric member 40 is placed, this cylindric member being hollow so as to provide a vertical passage 41 from the upper to the lower end thereof, the lower end of this passage 41 being in direct communication with the outlet pipe 39. The cylindric member 40 has a flange 42 in its lower end, to carry the weight thereof and to serve as a thrust bearing when the member 40 is rotated within the shell 28. A screw 44 is placed so that the head thereof will lie in a counterbore 45 in the lower end of the shell 28, to provide a stop for engagement with a shoulder on the lower end of the cylindric member 40.

In the upper end of the shell 28 a packing device 47 is provided around that portion of the member 40 which passes out through the upper end of the shell 28, and an annular channel 48 is formed in the member 40 above the plane defined by the upper end of the vertical passage 31 to receive lubricant through a grease fitting 49. A hand wheel 50 is secured on the projecting end 51 of the member 40, this hand wheel having a skirt 52 which projects down over the upper end of the shell 28. On this skirt 52 there is an index plate 53 having indices 54 for cooperation with a pointer 55 to show the position into which the member 40 has been rotated.

It will be noted that the upper end of a vertical passage 31 of the device 26 lies in a horizontal plane defined by the upper portion of the column 15. To cooperate with the opening or slot 29 of the shell 28, the member 40 has an opening or slot 56 in the form of a helix which extends from the plane defined by the bottom of the vertical passage 31 to a horizontal plane near the upper end of the passage 31. From one end to the other thereof the slot 56 rotates around the member 40 through an angle of less than 360°, or about 330°, so that only one portion of the slot 56 will cross the slot 29 at any time. For example, as shown in Fig. 2 the lower end of the slot 56 is in communication with the lower end of the vertical passage 31, but the upper end 57 of the slot 56 does not reach the upper end of the slot 29. For purpose of reinforcement of the member 40 bars 58 are welded in place in positions to extend across the slot 56.

The operation of the device will be perceived from the following. The column 15 tapers upwardly so that the lower portion of this column is of relatively large volume as compared to the volume of the lower portion of the hydromatic brake 10; therefore, the lower part of the column 15 will be capable of carrying an ample reserve supply of water for the taking care of surges which naturally occur. When the inner cylindric member 40 is in its position of Fig. 2, water passing through the piping 25 from the lower part of the column 15 may flow directly through the lower ends of the slots 29 and 56 and the outlet nipple 39 to the return piping 27 which leads to the reservoir 22. Accordingly, the level of liquid within the column 15 will be substantially that defined by the opening 32 of the device 26, for the reason that the water may flow out from the container 15 and through the opening 32 as fast as the pump 21 may feed water through the piping 23 and the nipple 20 into the lower part of the container 15. As increase in the water level W—W may be required, the inner cylindric member 40 is rotated by the driller so that other portions of the helical slot 56 are brought into crossing relation to the vertical slot 29, thereby varying the point vertically along the slot 29 to which water may flow from the vertical passage 31 into the interior space 41 of the member 40. For example, I have in Fig. 4 shown the member 40 rotated through an angle of about 90° from the position thereof shown in Fig. 2. This will bring a portion 66 of the slot 56 into crossing relation to the vertical slot 29 of the shell 28. The crossing of the slots 29 and 56 produces a port 66 connecting the vertical passage 31 with the interior space 41 of the member 40, and as the member 40 is rotated, the port 66 will move vertically, thereby providing for the container 15 a device which operates in response to rotation to vertically moving overflow port by which the level of liquid in the column 15 may be established and varied at the will of the driller to control the operation of the hydromatic brake. When the driller desires to cut down the braking action he will rotate the member 40 of the device 26 in anticlockwise direction, thereby lowering the port 66 so that water will drain from the column 15 and from the interior of the hydromatic brake 10. The indices 54 of the index plate 53 are calibrated to indicate the proportioning of the column 15 filled with liquid. Accordingly, the driller, knowing the braking effects to be obtained by different levels of water in the column 15, may readily set the variable standpipe to establish a desired overflow level for the container 15.

My invention also provides means for preventing the withdrawal of water from the container 15 by siphon action. As shown in Fig. 2, an inlet valve body 70 is supported at the upper end of the member 40, this valve body having an inlet passage 71 closed by a ball 72 held in raised position by a spring 73. Should sub-atmospheric pressure be produced in the passage 41, the valve element 72 will permit entry of air. Likewise, the openings 36 in the pipe 35 at the lower end of the shell 28, connect with the exterior and serve as vacuum breakers.

My invention contemplates that the adjustable overflow means may be placed within the tank 15 so as to have direct connection with the body of water therein, instead of being connected through piping such as indicated at 25 in Fig. 1. Likewise, the invention contemplates that the flow of water through the overflow control device 26 may be reversed, merely by reversing connections. For example, water may flow in to the device through the nipple 39 from the body of water within the tank 15, and may flow out of the device through the threaded opening 32. In the form of the invention shown in Fig. 5 the vertical standpipe passage 31 of Fig. 2 is omitted, the interior of the device constituting a standpipe of adjustable height. In Fig. 5 I show a reservoir 15' which is connected to the hydromatic brake 14 by means of piping 19'. Within the container 15' I place a shell 26' of cylindrical form, this shell 26' having a vertical slot 29'. The parts described are similar to the parts indicated in Figs. 2, 3, and 4 by the same numerals without prime marks employed therewith in order to simplify the identification of the respective parts and the explanation of their cooperative functions. Within the shell 26' I place a cylinder 40' defining a vertical space or standpipe 41', this cylinder 40' having a spiral slot 56' therein, so that by rotation of the inner cylindrical member 40' the point of crossing of the vertical slot 29' and the spiral slot 56' may be varied, thereby changing the overflow opening between the interior of the container 15' and the space 41' which is connected at its lower end by means of a fitting 80 with outlet piping 81 which may extend to a suitable water disposal such as a reservoir 82 from which a pump 83 operates to draw liquid and to deliver the same through piping 84 to the piping 19' so that such water will flow either into the lower part of the container 15' or the lower part of the hydromatic brake 14, or both.

A wheel 50' is connected to the upper end of the cylinder 40' at a point above the top of the container 15', and such wheel 50' may have the form of a sheave so that it may be rotated by suitable transmission, such as a rope 85 which forms a continuous loop or belt and extends around a wheel of sheave character 86 disposed at a distance from the wheel 50 and in such position that it may be rotated by the driller to enable the driller to transmit rotation to the cylinder 40' to selectively vary the height of the overflow opening 66'.

I claim as my invention:

1. In means for controlling a hydromatic brake of the character described connected to a drawworks: a container adapted to be disposed adjacent a hydromatic brake; means adapted to operatively connect said container with the interior of said hydromatic brake; means for feeding water into said container; and standpipe means disposed at the driller's position of said drawworks operative to vary the height of water in said container, said standpipe means comprising a pair of cylindrical members disposed one within the other and being arranged for relative rotation, there being openings in said cylindrical members cooperating as said relative rotation of said cylndrical members takes place to change the effective height of said standpipe means, and a pipe extending from said container to said standpipe means to carry water from said container to said standpipe means.

2. In means for controlling a hydromatic brake of the character described: a container adapted to be disposed adjacent a hydromatic brake; means adapted to operatively connect said container with the interior of said hydromatic brake; a source of water separate from said hydromatic brake; means having a connection leading to said container and a connection leading to said brake for feeding water from said source into said container and into said brake; a variable height overflow means operative to vary the height of the water in said container; and control means for said variable height overflow means disposed in a position to be operated by a driller controlling the drawworks of a well drilling rig.

SAMUEL W. WEBSTER.